Oct. 31, 1967  C. E. ROGERS  3,349,546
CHEMICAL AND HEAT ABSORBING APPARATUS
Filed Feb. 7, 1966
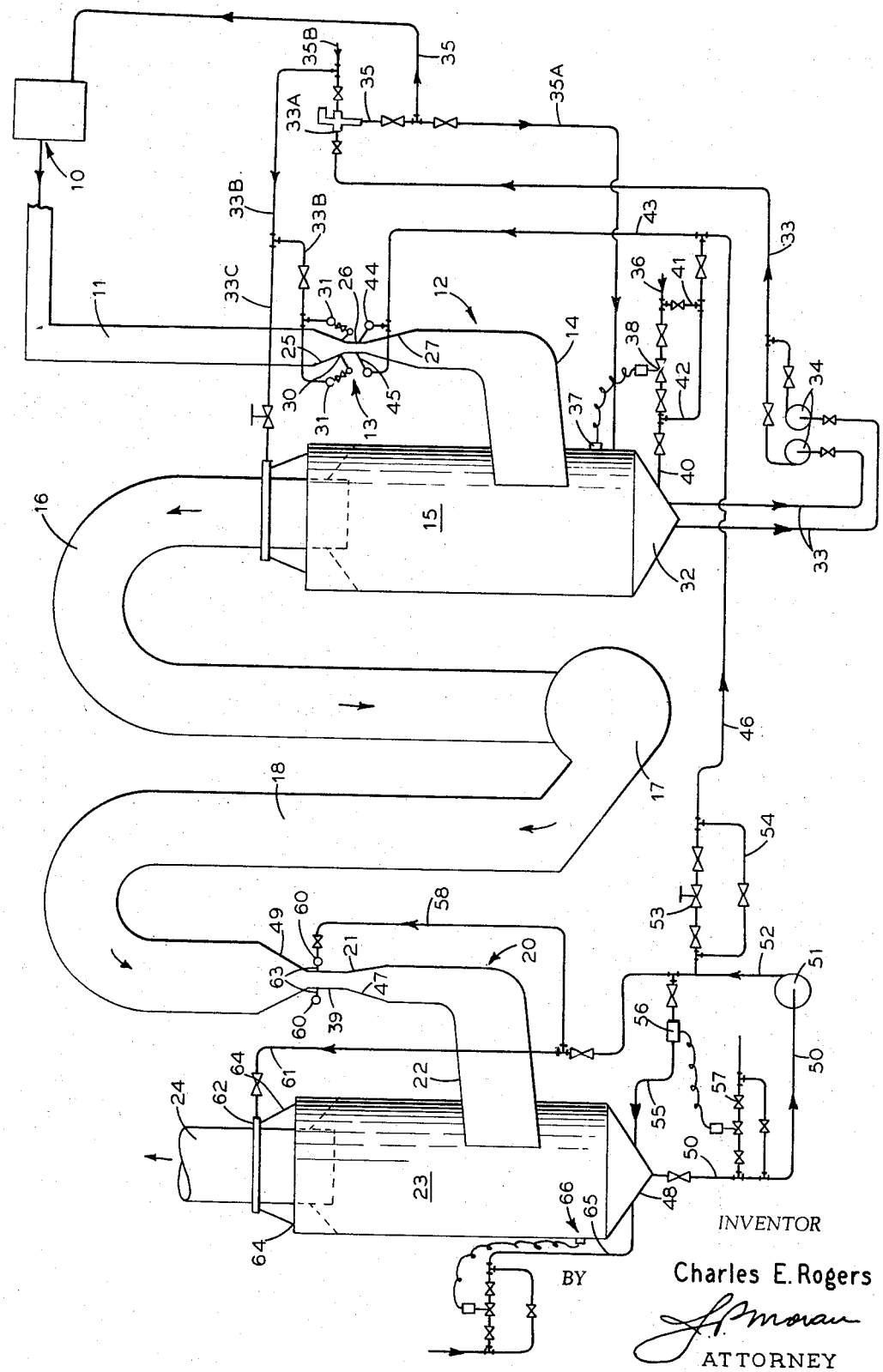
INVENTOR
Charles E. Rogers
BY
ATTORNEY

United States Patent Office 3,349,546
Patented Oct. 31, 1967

3,349,546
CHEMICAL AND HEAT ABSORBING APPARATUS
Charles E. Rogers, Alliance, Ohio, assignor to The Babcock & Wilcox Company, New York, N.Y., a corporation of New Jersey
Filed Feb. 7, 1966, Ser. No. 525,459
7 Claims. (Cl. 55—227)

ABSTRACT OF THE DISCLOSURE

A pair of venturi scrubbers arranged for series flow of hot flue gases therethrough for heat and chemical recovery. In one venturi scrubber the hot gases are contacted by partially concentrated liquor while in the second venturi scrubber the gases are contacted by a relatively low concentration liquid. A substantially constant flow of liquid passes from the second scrubber to the first scrubber for partial make-up purposes.

---

This invention relates to gas-liquid contact apparatus, and more particularly to a series arrangement of apparatus for sequential stages of intimate contact between a gaseous fluid medium and a liquid medium where each contact stage is followed by separation of the mediums.

Gas and liquid contact apparatus is used for many purposes including heat transfer, separation of entrained solids from a gaseous fluid and for absorption of chemicals in either the gas or the liquid. The wide range of uses for such gas-liquid contact apparatus can usually be defined or classified as heat or chemical recovery services, either alone or combined.

In the present invention a series arrangement of apparatus is provided for sequential contact between a gas and different liquid mediums so as to improve both heat and chemical recovery efficiencies with a minimum of energy requirements. More specifically the invention includes a first venturi scrubber unit including serially connected contact and separating zones, where a gas is contacted within the contact zone by a liquid medium for the recovery of heat and the subsequent removal of entrained solids and liquid medium from the gaseous fluid in the separating zone. After leaving the first venturi scrubber unit the gas is passed through a second venturi scrubber unit where it is contacted by a different sprayed liquid and the mixture then separated into its liquid and gaseous components before the gaseous effluent is discharged to the atmosphere. The second venturi scrubber unit is intended to remove a major portion of the residual amounts of entrained solids in the gas, with the separated liquid from the second unit used in part as makeup liquid to the first venturi scrubber unit.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

The single figure is a schematic illustration of the apparatus of the present invention.

As disclosed in the drawing the apparatus is illustrated as applied for the recovery of heat and the removal of entrained solids such as chemical dust and fume from the gases discharged from a residual liquor incinerating furnace 10 such as shown in U.S. Patent 2,893,829. The invention is not limited to this service, however it is particularly effective for the removal of entrained solids from the gases of combustion and the recovery of heat from such gases to further concentrate the liquor which is subsequently burned in the furnace.

As shown, the gases of combustion with entrained solids, which include sodium sulphate, are passed downwardly through a duct 11 into and through a first venturi scrubber unit 12. The gases are intimately mixed with a scrubbing liquid in a venturi duct section 13, as hereinafter described, and are introduced through duct 14 into a centrifugal separator 15. The gases entering the separator 15 have a tangential component of motion to provide centrifugal separation of the mixture of gas and the suspended matter therein. The construction of the separator 15 is disclosed in U.S. Patent 2,980,179. The gases, with a major portion of the entrained solids and liquid matter centrifugally separated therefrom, are passed through a duct 16, through an induced draft fan 17 and duct 18 into a second venturi scrubber unit 20. While passing through a venturi duct section 21 the gases are contacted by a liquid spray, as hereinafter described, with the mixture passing through a discharge duct 22 for tangential introduction into a centrifugal separator 23 similar to centrifugal separator 15. The gases are thereafter discharged to the atmosphere through a duct 24.

The venturi duct section 13 includes a converging portion 25, throat 26 and diverging portion 27, with two liquids of different viscosities being introduced into the gas stream passing therethrough. Liquor is passed from the sump 32 of the centrifugal separator 15 through a piping system 33 to manifolds 31 positioned on opposite sides of the venturi duct section 13, and thence through nozzles 30 into the gases. Two pumps 34 are provided, with either pump having a capacity sufficient to handle the full liquor flow of the system. The discharge from the piping system 33 passes through suitable filters 33A with a filtered liquor flowing at controlled rates through pipe 33B to the headers 31 and through branch pipe 33C to the wall wash nozzles of the separator 15. This liquor will be of a relatively high viscosity since it will have a solids content in the range of 55–70% by weight. The recirculated liquor is concentrated by the evaporation of moisture as it contacts the high temperature gases during passage through the venturi scrubber unit 12. Some of the liquor accumulated in the sump 32 of the separator after passing through the filters 33A, flows through pipe 35 to the incinerating furnace 10 where the liquor is burned to provide the combustion gases which subsequently enter the venturi scrubber by way of duct 11. A valved pipe 35A interconnects the filters 33A with the lower portion of the separator for return of liquor plus starting-up water introduced through valved pipe 35B to the separator.

Makeup liquor from multiple effect evaporators (not shown) with a concentration in the range of 40–50% solids by weight is delivered through the pipe 36. The flow of this liquor into the system is regulated by a level control sensor 37 positioned in the sump 32 of the separator 15 which actuates a flow control valve 38 in the pipe 36. The pipe 36 is provided with a valved extension 40 opening to the sump 32 (for start up purposes) and valved by-pass connections 41 and 42 on opposite sides of the valve 38 leading to a pipe 43 which opens into a manifold 44. The manifold is connected with nozzles 45 positioned in opposite sides of the throat portion 26 to project sheets of liquor into the gas stream downstream of the nozzles 30.

An additional amount of liquid is received from the centrifugal separator 23 through the pipe 46 which merges with the pipe 43. As hereinafter described, this liquid is delivered at a substantially uniform rate established by the operation of the second venturi scrubber unit, and will be of a density approximating 25% solids by weight.

The combination of relatively high viscosity recirculated liquor and relatively low viscosity liquor separately sprayed into the accelerated gas stream permits effective heat transfer between gas and liquor, and a relatively high efficiency of solids removal from the gases entering the first venturi scrubber unit 12 with a relatively low gas pressure drop. This viscosity relationship is disclosed in U.S. Patent 3,212,235.

The gases after leaving the centrifugal separator 15 pass through the duct 16, the induced draft fan 17, duct 18 and thence into the converging inlet portion 49 of the second venturi scrubber unit 20. The accelerated gases pass through the throat portion 39 in contact with sprayed liquid, as hereinafter described, through a diverging portion 47 and thence tangentially into the separator 23 for separation of liquid and gas, with the gas discharging to the atmosphere through duct 24. The venturi duct section 21 and the separator 23 are similar in construction to the venturi section 13 and separator 15, respectively, of the first venturi scrubber unit 12. The separated liquid accumulates in the inverted conical bottom, or sump 48 of the separator 23 and is withdrawn through pipe 50 by pump 51 for discharge through a pipe 52. The pipe 52 is provided with a connection to pipe 46 for controlled flow of liquid to the pipe 43, as regulated by control valve 53. Suitable cut off valves are positioned closely adjacent valve 53 and a valved by-pass line 54 is provided for emergency use. A bleed line 55 connects pipe 52 with the sump 48 of the separator 23 for continuous measurement of the pH of the liquid in pipe 52. This is accomplished by control mechanism 56 which regulates the admission of a caustic, such as NaOH, through the valve 57 into the system so as to reduce the corrosive effect of the liquid circulated through the second venturi scrubber unit 20. The pipe 52 is also provided with a connection 58 leading to a manifold 60 positioned adjacent the throat portion 46, and a pipe 61 leading to a manifold 62 encircling duct 24 upwardly adjacent the separator 23.

The header manifold 60 is connected with a plurality of nozzles 63 arranged to project sprays of liquid into the accelerated gases passing through the venturi duct section 21. The manifold 62 is connected with a circumferential series of spray nozzles 64 arranged in the upper portion of the separator 23 to wash the walls of the separator. Makeup water is delivered to the sump 48 of the separator 23 through a pipe 65, with flow regulated by a level control device indicated generally at 66. The rate of flow of makeup water to the unit compensates for the moisture evaporated by the gases passing through the scrubber 20 and the flow of liquid through the pipe 46 to the scrubber unit 12.

In the operation of the apparatus described, the gases discharged from the furnace may be at a temperature of 540° F. and have a total weight of 398,000 pounds per hour including 2915 pounds of sodium sulphate ($Na_2SO_4$). Upon discharge through the duct 24 the temperature will be of the order of 165° F. (above the dew point temperature) and a weight of 438,629, including the evaporated moisture. Not only will the residual pulp liquor be concentrated from the solids content of 45% (from the multiple effect evaporators) to 66.5%, but 2855 pounds per hour of sodium sulphate will be returned to the process.

To accomplish the heat and chemical recovery described, the manifold 31 will be supped with 1700 gallons per minute (g.p.m.) of recirculated liquor, and the manifold 44 with 220 g.p.m. of liquor from the second unit 20 and from the multiple effect evaporators. The manifold 60 will be supplied with 2700 g.p.m. of recirculated liquid.

It has been established that the heat and chemical dust recovery efficiency of a venturi scrubber is a function of the gas pressure drop due to flow of gases through the venturi. With the liquid sprayed into the gases in a generally transverse direction relative to gas flow the degree of liquid atomization, and thus the amount of solids recovery, is largely a function of gas velocity and the viscosity and quantity of the liquid present. Ordinarily, under the usual conditions described for the venturi-scrubber unit 12, a dust collection of 85 to 90% of the total dust entrained in the gas entering through the duct 11 can be obtained with a gas pressure drop through the unit of approximately 30 inches of water. In the present invention the gas velocity through the venturi is reduced to give a pressure drop value of the order of 20 inches with consequent reduction in the dust removal to the order of 80%.

With a lower viscosity liquid, such as a liquid having a solids content of about 25%, the second venturi scrubber unit 20 will have a dust removal efficiency of the order of 90% with a pressure drop of approximately 10 inches of water. Thus, by using the two venturi scrubber units 12 and 20, the dust removal efficiency will be in excess of 95% with a total gas pressure drop remaining of the order of 30 inches of water. Advantageously the solids recovery efficiency of the present invention is significantly improved without the expenditure of additional fan power.

What is claimed is:

1. Apparatus for concentrating residual pulp liquor and for scrubbing chemical dust and fume from hot flue gases including a furnace wherein concentrated liquor is burned to form said hot flue gases, scrubbing apparatus comprising a first venturi scrubber and a second venturi scrubber arranged in series, said venturi scrubbers each including a venturi duct section followed in a gas flow sense by a liquid and gas separator, means for passing substantially all of the hot gases from said furnace in series through said first and second venturi scrubbers, first nozzle means positioned to discharge concentrated sprayed liquor into said first venturi duct section, means including a piping system and pump for recirculating concentrated liquor from the liquid and gas separator of said first scrubber to said first nozzle means, second nozzle means positioned to discharge sprayed liquid into said second venturi duct section, means including a piping system and pump for recirculating liquid from the liquid and gas separator of said second scrubber to said second nozzle means in the corresponding venturi duct section, means for adding makeup liquid to said second venturi scrubber, pipe means connecting the piping system of said first venturi scrubber with said furnace for a controlled flow of concentrated liquor to said furnace for burning said liquor therein, and conduit means for passing a controlled flow of liquid from the piping system of said second venturi scrubber to said first venturi scrubber.

2. Apparatus according to claim 1, wherein separate nozzle means are positioned in the venturi duct section of said first venturi scrubber adjacent said first nozzle means, and means are provided for supplying makeup liquor to said separate nozzle means.

3. Apparatus according to claim 1, wherein means are provided for adding make-up liquor to the liquid and gas separator of said first venturi scrubber.

4. Apparatus according to claim 3 wherein means are provided to regulate the rate of flow of make-up liquor responsive to the amount of concentrated liquor in the bottom of said separator.

5. Apparatus according to claim 1 wherein means are provided to regulate the rate of flow of make-up liquor to said second venturi scrubber.

6. Apparatus according to claim 1 wherein means are provided for the introduction of a separate material to said second venturi scrubber to neutralize the liquid recirculated therethrough.

7. Apparatus for concentrating residual pulp liquor and for scrubbing chemical dust and fume from hot flue gases including a furnace wherein concentrated liquor is burned to form said hot flue gases, said scrubbing apparatus comprising first and second scrubbing units, said first scrubbing unit including a first venturi scrubber and a first liquid and gas separator downstream gas flow-wise of the first scrubber, said second scrubber unit including a second venturi scrubber and a second liquid and gas separator downstream gas flow-wise of the second scrubber, each venturi scrubber including a venturi duct section, means for passing substantially all of the hot gases from the furnace successively through the first and second scrubbing units, first nozzle means positioned to discharge concentrated sprayed liquor into the first venturi duct section, means for recirculating concentrated liquor from the first separator to the first nozzle means, second nozzle means positioned to discharge sprayed liquid into the second venturi duct section, means for recirculating liquid from the second separator to the second nozzle means, means for adding makeup liquid to the second scrubbing unit, means connecting the first separator with the furnace for a controlled flow of concentrated liquor to the furnace for burning the liquor therein, second nozzle means positioned adjacent said first nozzle means in said first venturi duct section, means for passing a controlled flow of partially concentrated liquor to said second nozzle means in said first venturi duct section, and means for passing a controlled flow of liquid from the second separator to the second nozzle means of said first venturi duct section.

References Cited

UNITED STATES PATENTS

| | | | |
|---|---|---|---|
| 2,590,905 | 4/1952 | Tomlinson et al. | 159—13 |
| 2,688,381 | 9/1954 | Epstein et al. | 55—19 |
| 2,746,844 | 5/1956 | Johnson et al. | 55—71 |
| 2,893,829 | 7/1959 | Hulton | 23—48 |
| 2,980,179 | 4/1961 | Campbell | 159—4 |
| 2,981,370 | 4/1961 | Pilo | 55—85 |
| 3,016,981 | 1/1962 | Pritz | 55—51 |
| 3,153,609 | 10/1964 | Markant et al. | 159—4 |
| 3,183,645 | 5/1965 | Teller | 55—238 |
| 3,212,235 | 10/1965 | Markant | 55—48 |
| 3,284,435 | 11/1966 | McIlroy et al. | 55—228 |

HARRY B. THORNTON, *Primary Examiner.*

B. NOZICK, *Assistant Examiner.*